(12) United States Patent
Muthsandra Kantharaju et al.

(10) Patent No.: US 9,445,051 B1
(45) Date of Patent: Sep. 13, 2016

(54) SENDER SIDE VIDEO TELEPHONY DOWNGRADE

(71) Applicant: QUALCOMM Incorporated, San Diego, CA (US)

(72) Inventors: Manjunatha Muthsandra Kantharaju, Karnataka (ID); Min Wang, San Diego, CA (US); Shankar Ganesh Lakshmanaswamy, Karnataka (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/826,932

(22) Filed: Aug. 14, 2015

(51) Int. Cl.
*H04N 7/15* (2006.01)
*H04N 7/14* (2006.01)
*H04L 29/06* (2006.01)
*H04L 12/24* (2006.01)

(52) U.S. Cl.
CPC ............ *H04N 7/15* (2013.01); *H04L 65/4053* (2013.01); *H04L 65/4069* (2013.01); *H04N 7/147* (2013.01); *H04L 41/5025* (2013.01)

(58) Field of Classification Search
None
See application file for complete search history.

(56) References Cited

U.S. PATENT DOCUMENTS

| 2013/0242775 | A1* | 9/2013 | Taylor | H04L 65/1006 370/252 |
| 2014/0118462 | A1* | 5/2014 | Zhao | H04W 76/022 348/14.02 |
| 2015/0029303 | A1 | 1/2015 | Lee et al. | |

FOREIGN PATENT DOCUMENTS

| GB | 2398452 | 9/2004 |
| WO | 2005029903 | 3/2005 |
| WO | 2005084063 | 9/2005 |

OTHER PUBLICATIONS

Desai, "An Adaptive QoS Mechanism for Multimedia Applications in Heterogeneous Environments," Oct. 2001, 63 pp.
Schulzrinne, et al., "RTP: A Transport Protocol for Real-Time Applications," Network Working Group, RFC 3550, Jul. 2003, 94 pp.
Wenger, et al., "Codec Control Messages in the RTP Audio-Visual Profile with Feedback (AVPF)," Network Working Group, RFC 5104, Feb. 2008, 64 pp.

* cited by examiner

*Primary Examiner* — Fan Tsang
*Assistant Examiner* — Jeffrey Lytle
(74) *Attorney, Agent, or Firm* — Shumaker & Sieffert, P.A.

(57) ABSTRACT

In an example, a method of processing data includes, in a video telephony session between a local device and a remote device, where the video telephony session includes at least one video connection between the local device and the remote device, identifying, by the local device, degraded playback of video data at the remote device. The method also includes, in response to identifying the degraded playback, terminating, by the local device, a video connection of the at least one video connection.

23 Claims, 6 Drawing Sheets

SENDER SIDE VIDEO TELEPHONY DOWNGRADE

TECHNICAL FIELD

This disclosure relates to the processing of video data.

BACKGROUND

Video telephony (VT) involves the real-time communication of packets carrying audio and video data. A VT device includes a video encoder that obtains video from a video capture device, such as a video camera or video archive, and generates video packets. Similarly, an audio encoder in a VT device obtains audio from an audio capture device, such as a microphone or speech synthesizer, or an audio archive, and generates audio packets. The video packets and audio packets are placed in a radio link protocol (RLP) queue. A medium access control (MAC) layer unit generates medium access control (MAC) layer packets from the contents of the RLP queue. The MAC layer packets are converted to physical (PHY) layer packets for transmission across a communication channel to another VT device.

In mobile VT applications, a VT device receives the physical layer packets via a wireless forward link (FL) (or "downlink") from a base station to the VT device as a wireless terminal. A VT device transmits the PHY layer packets via a wireless reverse link (RL) (or "uplink") to a base station. Each VT device includes PHY and MAC layers to convert the received PHY and MAC layer packets and reassemble the packet payloads into audio packets and video packets. A video decoder within the VT device decodes the video data for presentation to a user via a display device. An audio decoder within the VT device decodes the audio data for output via an audio speaker.

SUMMARY

Techniques of this disclosure relate to controlling a video telephony (VT) session based on network conditions. For example, according to aspects of this disclosure, a local device of a VT session (e.g., a sender side device) may downgrade the VT session based on data received from a remote device (e.g., a receiver side device) of the VT session. The local device may downgrade the VT session by terminating at least one video connection of the session. For example, the local device may downgrade the VT session from a two-way video session to a one-way video session, or from a one-way video session to an audio only session. The local device may make the downgrade determination based on data that provides an indication of a quality of playback of the video data, e.g., whether the playback has degraded relative to an earlier time in the session. In some instances, the sender side downgrade techniques may provide more robust control over a VT session than a downgrade that is initiated at the receiver side.

In an example, a method of processing data includes in a video telephony session between a local device and a remote device, wherein the video telephony session includes at least one video connection between the local device and the remote device, identifying, by the local device, degraded playback of video data at the remote device, and in response to identifying the degraded playback, terminating, by the local device, a video connection of the at least one video connection.

In another example, a device for processing data includes a memory configured to store video data, and one or more processors of a local device configured to, in a video telephony session between the local device and a remote device, wherein the video telephony session includes at least one video connection between the local device and the remote device, identify degraded playback of the video data at the remote device, and in response to identifying the degraded playback, terminate a video connection of the at least one video connection.

In another example, an apparatus for processing data includes, in a video telephony session between a local device and a remote device, wherein the video telephony session includes at least one video connection between the local device and the remote device, means for identifying, by the local device, degraded playback of the video data at the remote device, and means for terminating, in response to identifying the degraded playback, a video connection of the at least one video connection.

In another example, a non-transitory computer-readable medium has instructions stored thereon that, when executed, cause one or more processors to, in a video telephony session between a local device and a remote device, wherein the video telephony session includes at least one video connection between the local device and the remote device, identify, by the local device, degraded playback of the video data at the remote device, and in response to identifying the degraded playback, terminate, by the local device, a video connection of the at least one video connection.

The details of one or more examples of the disclosure are set forth in the accompanying drawings and the description below. Other features, objects, and advantages will be apparent from the description, drawings, and claims.

DETAILED DESCRIPTION

Figure 1:
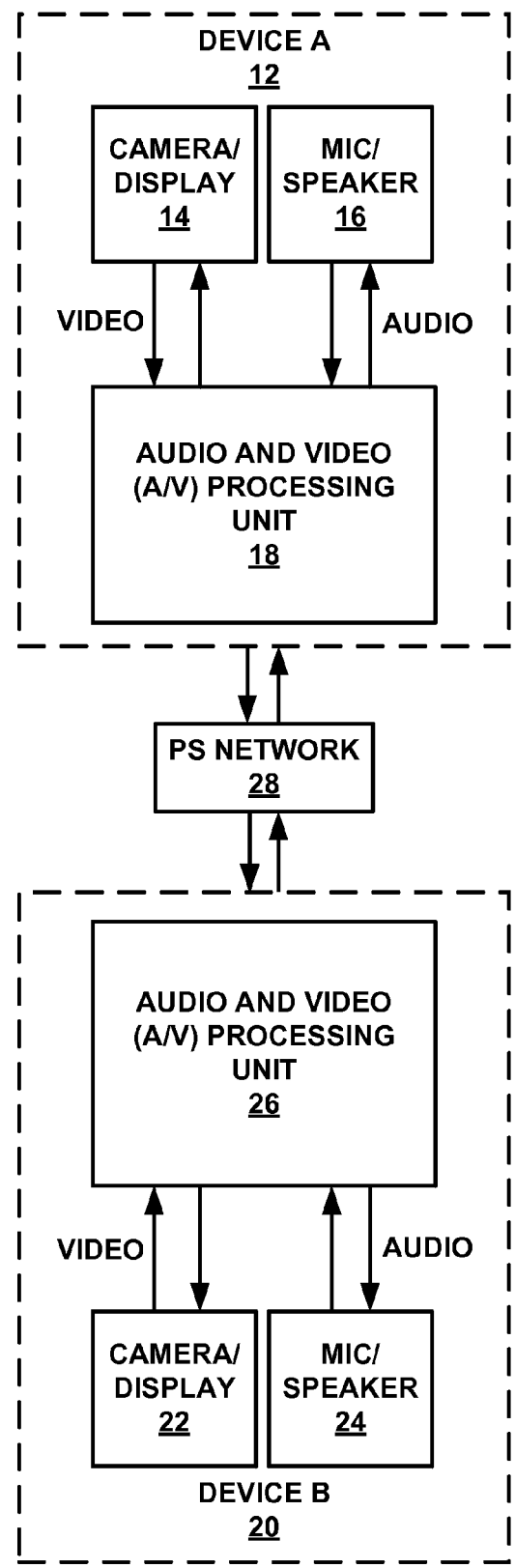
FIG. 1 is a block diagram illustrating a video telephony (VT) session between a first device and a second device, consistent with techniques of this disclosure.

Video telephony (VT) devices may be connected via a wired or wireless network for conducting a VT session (e.g., transmission of audio and/or video data between the VT devices). A VT device that is processing audio and/or video data for transmission to another VT device may be referred to as a local device. A local device may also be interchangeably referred to herein as user equipment (UE) or a sender device. A VT device that processes received audio and/or video data (e.g., for presentation to a user of the VT device) may be referred to as a remote device. The remote device may also be interchangeably referred to herein as a receiver device. A sender device may also act as a receiver device when participating in a two-way VT session.

During a VT session, a local device may encode audio and/or video data at a particular bitrate. The local device may select the bitrate based on network conditions. For example, the local device may select the bitrate based on a maximum (or near maximum) network link rate supported by the network being used for the VT session. In this way, the local device may prepare the data to be sent using the relatively highest quality supported by the network without exceeding the limitations of the network.

The network link rate connecting VT devices may vary, particularly when using VT over a wireless network such as Wi-Fi or cellular networks. In some instances, network equipment may use buffers to handle link rate fluctuations and/or to perform queue management. For example, the local device may include a buffer for buffering encoded audio and/or video data prior to transmitting the data to the remote device. Likewise, the remote device may buffer received data prior to playout (e.g., presentation of the audio and/or video data to a user). A sudden reduction in the network link rate may cause audio and/or video packets to become partially or completely lost during transmission between the local device and the remote device, which may adversely impact the VT session. For example, when the network link rate is reduced, lost or corrupted data packets may cause interruptions and/or jerkiness in video playout at the remote device.

Upon identifying a reduction in the network link rate, the local device may alter a bitrate at which audio or video data is sent to the network (which may be referred to herein as a sending bitrate). That is, the local device may perform rate control at a video encoder of the local device to reduce the bitrate at which the video data is encoded. In some instances, the video encoder may have a minimum bitrate restriction and may not encode video data at a bitrate below the minimum bitrate.

The local device may receive feedback from the remote device that indicates that the quality of the video data played out to a user of the remote device is poor. For example, the local device may receive data that indicates that packets were lost during transmission of the video data from the local device to the remote device, which may result in a degraded playback at the remote device (e.g., video jerkiness, freezing, or other quality issues). In some examples, the local device may continue receiving such feedback, even after reducing the bitrate of the video data being sent to the remote device to the minimum bitrate.

However, the receiver is typically responsible for initiating a downgrade of the VT session, e.g., from a two-way video telephony session to a one-way video telephony session. Accordingly, the local device may continue to send video data to the remote device, despite receiving the data that indicates degraded playback at the remote device.

According to aspects of this disclosure, the local device of a VT session may downgrade the VT session based on data received from the remote device of the VT session. For example, the local device may downgrade the VT session without receiving a request from the remote device to downgrade the VT session. The local device may downgrade the VT session by terminating at least one video connection of the session. For example, the local device may downgrade the VT session from a two-way video session to a one-way video session, or from a one-way video session to an audio only session. The local device may make the downgrade determination based on data that provides an indication of a quality of playback of the video data, e.g., whether the playback has degraded relative to an earlier time in the session.

In some instances, allowing the local device to downgrade a VT session may provide more robust and proactive control over the VT session than a downgrade that is initiated by the remote device. For example, in some instances, the remote device may not have a VT session downgrade mechanism or may have a downgrade mechanism that is not functioning properly. In such instances, the techniques of this disclosure may provide a downgrade mechanism to terminate at least one video connection while still maintaining the VT session.

Moreover, even if a remote device is equipped with a VT session downgrade mechanism, different local devices may be equipped with different video encoders having different capabilities. Accordingly, in some examples, a local device may be more proficient at determining the limitations of a video encoder (e.g., a minimum sustainable bitrate) and/or a sustainable packet loss rate. In such examples, the techniques of this disclosure may provide for a more prompt downgrade upon identifying degraded playback at the remote device.

FIG. 1 is a block diagram illustrating a video telephony (VT) session between a first device and a second device, consistent with techniques of this disclosure. First device 12 (Device A) includes a camera and display unit 14, a microphone and speaker unit 16, and an audio and video (A/V) processing unit 18. Second device 20 (Device B) includes that a camera and display unit 22, a microphone and speaker unit 24, and an audio and video (A/V) processing unit 26. First device 12 communicates with second device 20 via packet switched (PS) network 28.

In the example of FIG. 1, first device 12 may be configured as a smartphone, tablet computer, laptop computer, desktop computer, WiFi enabled television, video conferencing device, or any other device capable of transmitting audio and video data. Likewise, second device 20 may be configured as a smartphone, tablet computer, laptop computer, desktop computer, WiFi enabled television, video conferencing device, or any other device capable of receiving audio and video data and receiving user input data.

Camera and display unit 14 and camera and display unit 22 may each include a camera for capturing still or video images and a display for presenting video data to a user of first device 12 or second device 20. The display may comprise any of a variety of video output devices such as a cathode ray tube (CRT), a liquid crystal display (LCD), a plasma display, a light emitting diode (LED) display, an organic light emitting diode (OLED) display, or another type of display device. In these or other examples, the display device may be an emissive display or a transmissive display.

Microphone and speaker unit 16 and microphone and speaker unit 24 may each include a microphone for capturing sound and a speaker for presenting sound to a user of first device 12 or second device 20. The speaker may comprise any of a variety of audio output devices such as headphones, a single-speaker system, a multi-speaker system, or a surround sound system.

A/V processing unit 18 and A/V processing unit 26 may include a number of units responsible for processing audio and/or video data. Each of A/V processing unit 18 and A/V processing unit 26 may be implemented as one or more microprocessors, digital signal processors (DSPs), application specific integrated circuits (ASICs), field programmable gate arrays (FPGAs), discrete logic, hardware, or any combinations thereof, and may be configured to execute software and/or firmware. Each of A/V processing unit 18 and A/V processing unit 26 may include one or more video encoders or video decoders, either of which may be integrated as part of a combined encoder/decoder (CODEC).

To process video data, A/V processing unit 18 and A/V processing unit 26 may implement any number of audio and video compression standards, such as the ITU-T H.264 standard, alternatively referred to as MPEG-4, Part 10, Advanced Video Coding (AVC), or the High Efficiency Video Coding (HEVC) standard, sometimes called the H.265 standard. Generally speaking, A/V processing unit 26 may be configured to perform the reciprocal coding operations of A/V processing unit 18.

PS network 28 generally represents any suitable communication medium, or collection of different communication media, for transmitting audio and/or video data from first device 12 to second device 20. PS network 28 may comprise any wireless or wired communication medium, such as a radio frequency (RF) spectrum or one or more physical transmission lines, or any combination of wireless and wired media (e.g., Long-Term Evolution (LTE), High Speed Packet Access (HSPA), Enhanced High Rate Packet Data ((e)HRPD), WiFi, satellite, coax cable, power line, or any combination thereof). PS network 28 may form part of a packet-based network, such as a local area network, a wide-area network, or a global network such as the Internet. Hence, first device 12 and second device 20 may communicate over communication channel using a communications protocol such as a standard from the IEEE 802.11 family of standards.

The example of FIG. 1 generally illustrates a two-way VT session over PS network 28. For example, first device 12 may be a local device responsible for capturing audio and/or video using camera and display unit 14 and microphone and speaker unit 16. A/V processing unit 18 may encode or otherwise compress the audio and/or video data. A/V processing unit 18 also packetize the data for transmission over PS network 28. In some instances, as described in greater detail below with respect to the example of FIG. 2, A/V processing unit 18 may apply one or more protocols to packetize the data, such as a real-time transport protocol (RTP), a user datagram protocol (UDP), and/or an Internet protocol (IP). In some examples, A/V processing unit 18 may also generate audio and/or video real-time transport control protocol (RTCP) packets along with audio and/or video RTP packets for syncing the audio and video, for media performance related statistics, for rate adaptation, or the like.

At second device 20, A/V processing unit 26 may demodulate, de-packetize (e.g., using the same protocols implemented at first device 12), de-jitter, decode, A/V sync, and/or post-process received packets. A/V processing unit 26 may then send the processed data to camera and display unit 22 and/or microphone and speaker unit 24 for playback to a user of second device 20. In some examples, A/V processing unit 26 may also send feedback data to first device 12 regarding the characteristic of the received data. For example, A/V processing unit 26 may also generate audio and/or video RTCP packets for relaying control data and/or media performance related statistics back to first device 12.

The bandwidth of PS network 28 may vary during a VT session between first device 12 and second device 20. When bandwidth is limited, packets carrying audio or video data may be dropped, lost, or corrupted along PS network 28. In such instances, packet loss due to network path deterioration may result in poor quality video or video freeze during playback at second device 20.

In the example described above, first device 12 may be considered a local device (e.g., responsible for encoding and transmitting audio and/or video data) and second device 20 may be considered a remote device (e.g., responsible for decoding an playback of the data from first device 12). The remote device may typically be responsible for initiating a VT session downgrade, e.g., from a two-way video connection to a one-way video connection or from a one-way video connection to an audio only call. Accordingly, first device 12 may generally continue sending video data to second device 20 until a downgrade is initiated by second device 20, despite receiving messages (e.g., RTCP packets) from second device 20 that indicate poor video quality or video freeze at the remote device.

According to aspects of this disclosure, first device 12 (e.g., the sender side device) may take an action to downgrade a VT session. In an example for purposes of illustration, first device 12 may initiate a VT session having a two-way video connection with second device 20. Upon receiving feedback from second device 20 that indicates degraded playback of video data at second device 20, first device 12 may perform rate control at a video encoder of first device 12 to adapt the video bitrate of the video connection from first device 12 to second device to a lower bitrate (e.g., a minimum supported bitrate by the video encoder of first device 12).

If first device 12 continues to receive feedback from second device 20 that indicates a degraded playback, first device 12 may initiate a VT session downgrade to a one-way video connection. In addition, if first device 12 continues to receive feedback from second device 20 that indicates a degraded playback, first device may initiate a VT session downgrade to an audio only connection. In this example, the techniques include a multi-tier approach to downgrading a VT session based on network conditions (e.g., two-way video telephony to one-way video telephony to audio only).

According to aspects of this disclosure, first device 12 may determine whether to initiate a VT session downgrade based on data received from second device 20. The data may include one or more RTCP packets and/or other data indicating a quality of data received at second device 20. In some examples, the data may indicate a number of data packets lost during transport, a fraction of data packets lost during transport, or other information regarding loss of data due to network path deterioration. That is, first device 12 may infer degraded playback in instances in which a relatively large amount of data is lost or corrupted.

In some instances, first device 12 may initiate a VT session downgrade based on a quantity of lost or corrupted data as indicated by data received from second device 20 (e.g., data that indicates the quantity of lost or corrupted data, one or more requests to retransmit lost packets, or the like). Additionally or alternatively, first device 12 may initiate a VT session downgrade based on video quality being degraded for a predetermined time period. First device 12 may use static or variable thresholds. e.g., based on the capabilities of first device 12 and/or second device 20.

Figure 2:
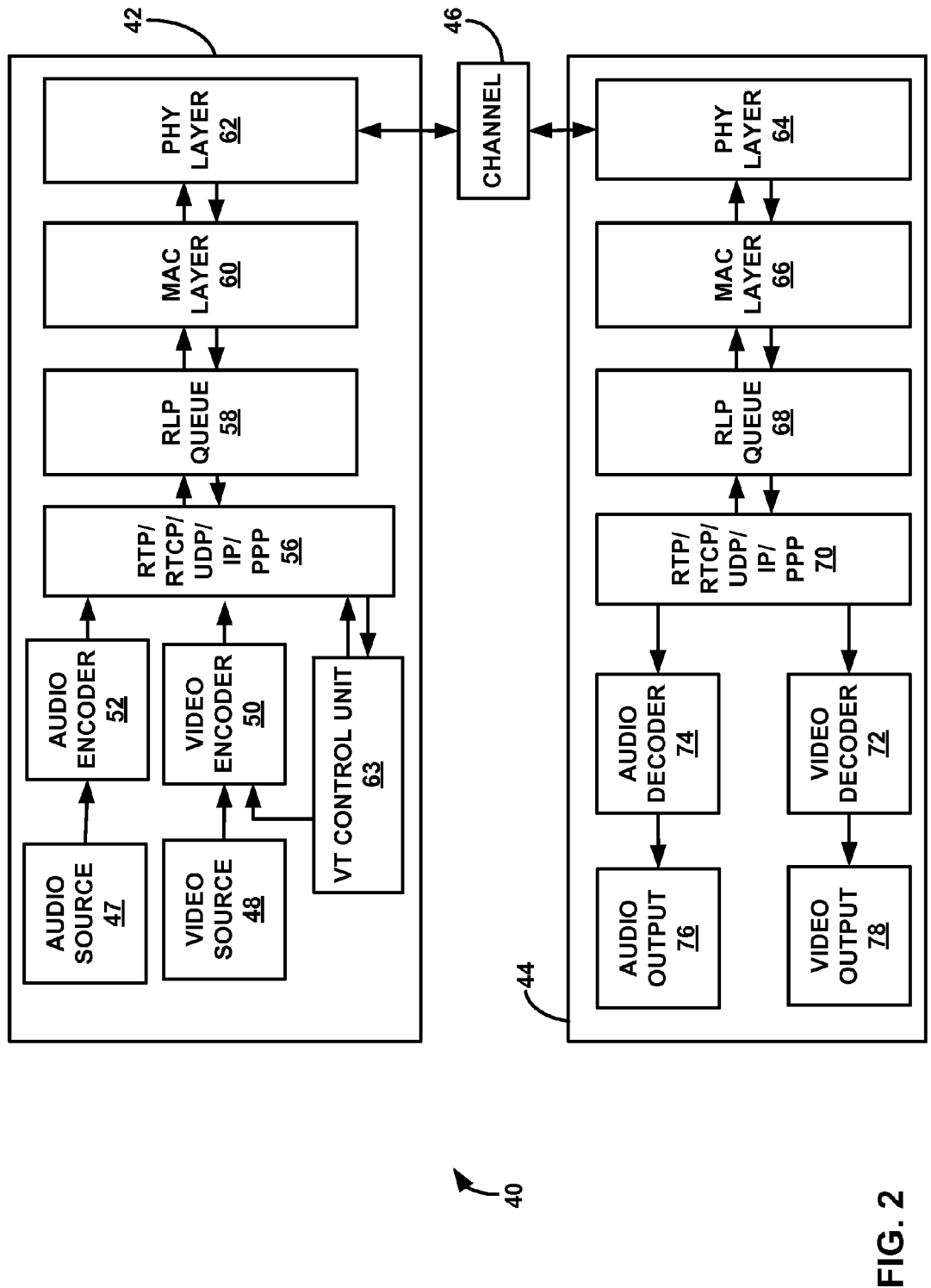
FIG. 2 is a block diagram illustrating a local device and a remote device that may implement the techniques of this disclosure.

FIG. 2 is a block diagram illustrating a VT system 40 that includes a local device 42 and a remote device 44 that are connected by a transmission channel 46. In the example of FIG. 2, local device 42 includes an audio source 47, video source 48, video encoder 50, audio encoder 52, real-time transport protocol (RTP)/real-time transport protocol (RTCP)/user datagram protocol (UDP)/Internet protocol (IP)/point-to-point protocol (PPP) conversion unit 56, radio link protocol (RLP) queue 58, MAC layer unit 60, physical (PHY) layer unit 62, and VT control unit 63. Remote device 44 includes a PHY layer unit 64. MAC layer unit 66, RLP queue 68, RTP/RTCP/UDP/IP/PPP conversion unit 70, video decoder 72, audio decoder 74, audio output device 76 and video output device 78.

System 40 may provide bi-directional video and audio transmission, e.g., for VT via transmission channel 46. Accordingly, generally reciprocal encoding, decoding, and conversion units may be provided on opposite ends of channel 46. In some examples, local device 42 and remote device 44 may be embodied within video communication devices such as wireless mobile terminals equipped for video streaming, video telephony, or both. The mobile terminals may support VT according to packet-switched standards such as RTP, RTCP, UDP, IP, or PPP.

For example, at local device 42, RTP/RTCP/UDP/IP/PPP conversion unit 56 adds appropriate RTP/RTCP/UDP/IP/PPP header data to audio and video data received from video encoder 50 and audio encoder 52 and places the data in RLP queue 58. An example bitstream may include a MAC header, an IP header, a UDP header, an RTCP header, and the payload data. In some examples, RTP/RTCP runs on top of UDP, while UDP runs on top of IP, and IP runs on top of PPP. In some examples, as described herein, RTP/RTCP/UDP/IP/PPP conversion unit 56 may conform to a particular standard, such as "RFC 3550: RTP: A Transport Protocol for Real-Time Applications," H. Schulzrinne et al., July 2003, "RFC 5104: Codec Control Messages in the RTP Audio-Visual Provide with Feedback (AVPF)," S. Wenger et al., February 2008 (hereinafter RFC 5104), and/or other applicable standards for real-time or near real-time transport of data. MAC layer unit 60 generates MAC RLP packets from the contents of RLP queue 58. PHY layer unit 62 converts the MAC RLP packets into PHY layer packets for transmission over channel 46.

PHY layer unit 64 and MAC layer unit 66 of remote device 44 operate in a reciprocal manner. PHY layer unit 64 converts PHY layer packets received from channel 46 to MAC RLP packets. MAC layer unit 66 places the MAC RLP packets into RLP queue 68. RTP/RTCP/UDP/IP/PPP conversion unit 70 strips the header information from the data in RLP queue 68, and reassembles the video and audio data for delivery to video decoder 72 and audio decoder 74, respectively.

In general, channel 46 carries the PHY layer packets from local device 42 to remote device 44. Channel 46 may be any physical connection between local device 42 and remote device 44. For example, channel 46 may be a wired connection, such as a local or wide-area wired network. Alternatively, as described herein, channel 46 may be a wireless connection such as a cellular, satellite or optical connection. Channel conditions may be a concern for wired and wireless channels, but may be particularly pertinent for mobile VT applications performed over a wireless channel 46, in which channel conditions may suffer due to fading or congestion. Channel 46 may support a particular network link rate (e.g., a particular bandwidth), which may fluctuate according to channel conditions. For example, channel 46 may be characterized by a reverse link (RL) having a throughput that varies according to channel conditions.

At local device 42, video source 48 provides video data to video encoder 50. Video encoder 50 generates encoded video data according to a video compression method, such as MPEG-4, ITU H.264, alternatively referred to as MPEG-4, Part 10, Advanced Video Coding (AVC), ITU H.265, High Efficiency Video Coding (HEVC), or another video coding standard. Other video compression methods include the International Telecommunication Union (ITU) H.263 or MPEG-2 methods. Audio encoder 52 encodes audio data to accompany the video data. Video source 48 may be a video capture device, such as one or more video cameras, one or more video archives, or a combination of video cameras and video archives.

Audio source 47 provides audio data to audio encoder 52. Audio encoder 52 may encode the audio data according to an audio compression method, such as adaptive multi-rate narrow band (AMR-NB), or other techniques. The audio source 47 may be an audio capture device, such as a microphone, or a speech synthesizer device. For VT applications, the video will permit viewing of a party to a VT conference and the audio will permit the speaking voice of that party to be heard.

RTP/RTCP/UDP/IP/PPP conversion unit 56 obtains video and audio data packets from video encoder 50 and audio encoder 52. As mentioned previously, RTP/RTCP/UDP/IP/PPP conversion unit 56 adds appropriate header information to the audio packets and inserts the resulting data within RLP queue 58. Likewise, RTP/RTCP/UDP/IP/PPP conversion unit 56 adds appropriate header information to the video packets and inserts the resulting data within RLP queue 58. MAC layer unit 60 retrieves data from RLP queue 58 and forms MAC layer packets. Each MAC layer packet carries RTP/RTCP/UDP/IP/PPP header information and audio or video packet data that is contained within RLP queue 58. Audio packets may be inserted into RLP queue 58 independently of video packets.

In some cases, a MAC layer packet generated from the contents of RLP queue 58 will carry only header information and video packet data. In other cases, the MAC layer packet will carry only header information and audio packet data. In many cases, the MAC layer packet will carry header information, audio packet data and video packet data, depending on the contents of RLP queue 58. The MAC layer packets may be configured according to a radio link protocol (RLP), and may be referred to as MAC RLP packets. PHY layer unit 62 converts the MAC RLP audio-video packets into PHY layer packets for transmission across channel 46.

At remote device 44. PHY layer unit 64 identifies the MAC layer packets from the PHY layer packets and reassembles the content into MAC RLP packets. MAC layer unit 66 then reassembles the contents of the MAC RLP packets to provide video and audio packets for insertion within RLP queue 68. RTP/RTCP/UDP/IP/PPP unit 70 removes the accompanying header information and provides video packets to video decoder 72 and audio packets to audio decoder 74. Video decoder 72 decodes the video data frames to produce a stream of video data for playback, e.g., for use in driving video output device 78. Audio decoder 74 decodes the audio data to produce audio information for presentation to a user, e.g., via an audio speaker at audio output device 76.

In some examples, remote device 44 may generate control data for transmission to local device 42 via channel 46. For example, RTP/RTCP/UDP/IP/PPP unit 70 of remote device 44 may generate one or more RTCP packets. In general, RTCP is based on the periodic transmission of control packets to all participants of a particular session that uses the same distribution mechanism as the data packets (e.g., the RTP packets). Hence, the underlying RTCP protocol provides multiplexing of the data and control packets, for example using separate port numbers with UDP.

RTCP packets may contain a variety of data for controlling a VT session. For example, an RTCP sender report (SR) may include transmission and reception statistics from participants of the VT session that are active senders. An RTCP receiver report (RR) may include reception statistics from participants that are not active senders. Accordingly, RTCP packets may include data that describes a characteristic of the received data.

For example, a sender device (e.g. such as local device 42) may rely on RTCP packets to detect end-to-end channel conditions and may use the data contained in the packets to calculate the net throughput, albeit with some measurement delay due to the RTCP reporting. As an example, an RTCP report may include an indication of a fraction of the number of packets lost in transmission. That is, a fraction lost field of an RTCP report may indicate a fraction of RTP data packets from a sender device that have been lost since a previous SR or RR packet was sent. The fraction may be defined to be the number of packets lost divided by the number of packets expected.

As another example, an RTCP report may include an indication of a cumulative number of packets lost in transmission. That is, a cumulative number of packets lost field of an RTCP report may indicate a total number of RTP data packets from the sender device that have been lost since the beginning of reception. The cumulative number of packets lost may be defined to be the number of packets expected less the number of packets actually received.

As still another example, an RTCP report may include an indication of interarrival jitter. That is, an interarrival jitter field of an RTCP report may indicate an estimate of a statistical variance of the RTP data packet interarrival time, measured in timestamp units and expressed as an unsigned integer. For example, an interarrival jitter J may be defined to be the mean deviation of a difference D in packet spacing at the receiver compared to the sender for a pair of packets.

According to aspects of this disclosure, VT control unit 63 of local device 42 may identify degraded playback of video data at remote device 44. VT control unit 63 may be implemented as one or more microprocessors, digital signal processors (DSPs), application specific integrated circuits (ASICs), field programmable gate arrays (FPGAs), discrete logic, hardware, or any combinations thereof, an may be execute suitable software and/or firmware. In some examples, VT control unit 63 may form a portion of an IP multimedia subsystem (IMS).

In some examples, VT control unit 63 may identify degraded playback of the video data based on the control data received from remote device 44. The control data may include one or more RTCP packets. For example, the RTCP packets described above may provide an indication of degraded playback of video data at remote device 44. In some examples, if a relative large number of packets are lost in transmission (e.g., as indicated by fraction lost RTCP data and/or cumulative lost RTCP data). VT control unit 63 may determine that playback has been degraded due to the lost data (e.g., poor video quality or video freeze). In this way, VT control unit 63 may identify degraded playback at remote device 44.

Additionally or alternatively, the absence of RTCP packets may also provide an indication of degraded playback of video data at remote device 44. For example, if VT control unit 63 does not receive RTCP packets, VT control unit 63 may determine that the video data has not been received at remote device 44 at all, or that remote device 44 is malfunctioning in a way that prevents remote device 44 from sending RTCP packets. In this way, VT control unit 63 may identify degraded playback at remote device 44.

According to aspects of this disclosure, VT control unit 63 may implement a variety of criteria and/or thresholds to identify degraded playback of video data at remote device 44 and downgrade the VT session. For example, VT control unit 63 may identify degraded playback based on an amount of data that is lost (e.g., data that is sent to channel 46 by local device 42 but not received by remote device 44) exceeding a predetermined threshold during a VT session. As described in greater detail below, upon identifying the degraded playback, VT control unit 63 may downgrade the VT session by terminating one or more video connections of the VT session.

In some examples, VT control unit 63 may identify degraded playback based on a cumulative number of data packets that are lost during the VT session. In an example for purposes of illustration, VT control unit 63 receive feedback data from remote device 44 that indicates a number of data packets (e.g., such as RTP packets) that were lost during transmission. VT control unit 63 may receive one or more messages containing such feedback. VT control unit 63 may track the number of lost packets and may identify degraded playback when the number of lost packets exceeds a threshold.

Additionally or alternatively, VT control unit 63 may identify degraded playback based on a fraction of the number of data packets lost during the VT session. For example, VT control unit 63 receive feedback data from remote device 44 that indicates a percentage of lost data packets relative to the total number of data packets sent. VT control unit 63 may receive one or more messages containing such feedback. VT control unit 63 may track the percentage of lost packets indicated by one or more of the feedback messages and may identify degraded playback when the percentage exceeds a threshold.

In a non-limiting example for purposes of illustration, VT control unit 63 may identify degraded playback of video data at remote device based on a percentage of lost packets being equal to or greater than a threshold of 10%. For example, VT control unit 63 may receive a current feedback message that indicates a 10% packet loss of packets sent between a previous feedback message being received and the current feedback message being received. VT control unit 63 may identify degraded playback based on the current feedback message and initiate a VT session downgrade. In other examples, VT control unit 63 may be configured to use an alternative threshold (e.g., 5%, 15% or the like). Additionally or alternatively, VT control unit 63 may track packet loss over a number of feedback messages.

In some examples, VT control unit 63 may identify degraded playback using one or more time-based thresholds. For example, VT control unit 63 may identify degraded playback based on an amount of data that is lost exceeding a threshold during a predetermined duration. The quantity of data lost and/or time based thresholds described above may be static or dynamic. For example, VT control unit 63 may be preconfigured to implement fixed quantity of data lost and/or time based thresholds, regardless of the capabilities of local device 42, remote device 44, or channel 46. In other examples, VT control unit 63 may be configured to change the quantity of data lost and/or time based thresholds based on the capabilities of local device 42, remote device 44, or channel 46. For example, if video decoder 72 of remote device is equipped with an error recovery mechanism, VT control unit 63 may implement a relatively higher quantity of data lost and/or time based threshold before identifying degraded playback.

In response to identifying the degraded playback, VT control unit 63 may terminate one or more video connections of a VT session. As one example, VT control unit 63 may terminate a video connection such that VT session having a two-way video connection is downgraded to a one-way video connection. As another example, VT control unit 63 may terminate a video connection such that VT session having a one-way video connection is downgraded to an audio only VT session (e.g., no video data is transmitted or received by local device 42 or remote device 44).

Figure 3:
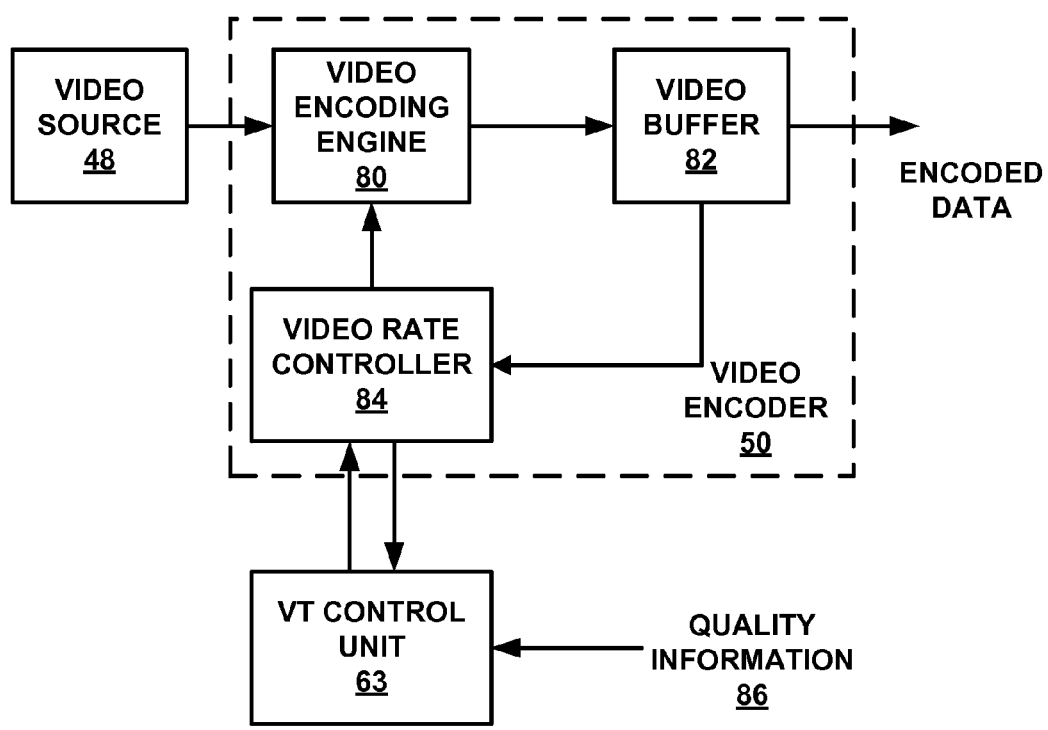
FIG. 3 is a block diagram illustrating the local device of FIG. 2 in greater detail.

FIG. 3 is a block diagram illustrating a portion of local device 42 (FIG. 2) in greater detail. For example, FIG. 3 illustrates video encoder 50 having video encoding engine 80, video buffer 82 and video rate controller 84. VT control unit 63 receives quality information 86, which may be prepared by remote device 44.

In general, video encoding engine 80 obtains video data from video source 48 and encodes the video data at a rate controlled by video rate controller 84. Video encoding engine 80 then places the encoded video in video buffer 82. Video rate controller 84 may monitor the fullness of video buffer 82 and control the video encoding rate applied by video encoding engine 80, at least in part, based on the fullness.

In some examples, video encoder 50 may provide a video source rate control scheme that is generally CODEC-independent. For example, video encoder 50 may be adapted for video encoding according to ITU H.265 (HEVC), MPEG4. ITU H.263. ITU H.264. In addition, video encoder 50 may be susceptible to implementation within a DSP or embedded logic core. In some examples, video encoder 50 (e.g., video rate controller 84 or video encoder 50) may apply model-based rate control, e.g., applying video block rate control in the rho domain. For example, once a frame bit budget is established for a particular video frame, the frame bit budget may be allocated among the video blocks, e.g., coding units (CUs) and/or macroblocks (MBs), within the frame. According to aspects of this disclosure, video rate controller 84 may receive rate control data from VT control unit 63 and may apply rate control based on the received rate control data. For example, VT control unit 63 may receive quality information 86. Quality information 86 may be prepared by remote device 44 (FIG. 2) or another network device (e.g., another participant in a VT session with local device 42.

In some examples, the quality information 86 may include data that indicates a quality of data being received by a remote device that is a participant of a VT session with local device. For example, quality information 86 may provide an indication of a difference between the encoded data sent from video buffer 82 and the data that is received by the remote device. As described herein, a decline in network bandwidth may result in at least a portion of the encoded video data not being received by the remote device. A relatively large amount of lost and/or corrupted data may result in degraded playout of the video data at the remote device.

In some examples, quality information 86 may include control data used for controlling the VT session. For example, quality information 86 may include RTCP packets that provide an indication of an amount of encoded data that is lost during transmission over the network. In other examples, quality information 86 may include any other data prepared by the remote device or another network entity that provides an indication of the quality of data being received by the participants of the VT session.

According to aspects of this disclosure, VT control unit 63 may receive quality information 86 and may make VT downgrade determinations based on the received quality information 86. For example, VT control unit 63 may implement one or more quality based thresholds to determine whether to downgrade a particular VT session. In some examples, VT control unit 63 may downgrade a VT session based on an amount of lost video data exceeding a threshold. In other examples, VT control unit 63 may downgrade the VT session based on an amount of lost video data exceeding a threshold during a predetermined time period.

In some examples, VT control unit 63 may downgrade a VT session by instructing video rate controller 84 to perform rate control at video encoding engine 80. For example, upon receiving quality information 86 that indicates relatively poor video quality at a remote device (e.g., such as remote device 44), VT control unit 63 may instruct video rate controller 84 to reduce the bitrate at which video encoding engine 80 encodes video data. In some instances, VT control unit 63 may downgrade the VT session by instructing video rate controller 84 to reduce the bitrate at which video encoding engine 80 encodes video data to a minimum bitrate that is supported by video encoding engine 80.

In some instances, VT control unit 63 may continue to receive quality information 86 that indicates relatively poor video quality at the remote device. In such instances, VT control unit 63 may downgrade the VT session by terminating the video connection, such that video encoding engine 80 does not encode and transmit encoded video data to the network.

Figure 4:
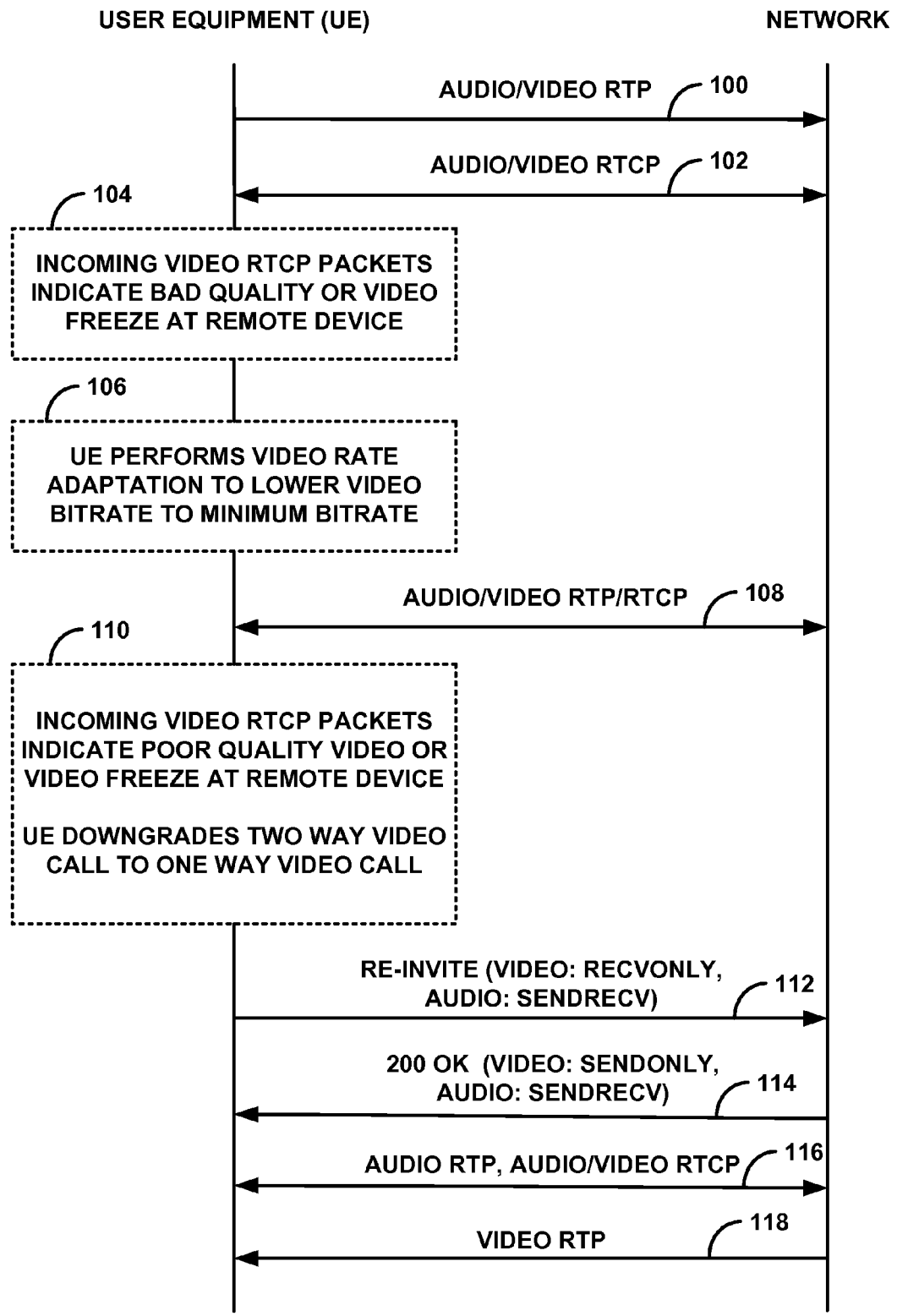
FIG. 4 is a flow diagram illustrating an example of a video downgrade, consistent with the techniques of this disclosure.

FIG. 4 is a flow diagram illustrating an example of downgrading a VT session with a two-way video connection to a VT session with a one-way video connection, consistent with the techniques of this disclosure. For example, FIG. 4 illustrates user equipment (UE) that is a participant in a VT session with a two-way video connection over a network. In some examples, UE may be configured in a similar manner as local device 42 (FIG. 2).

In the example of FIG. 4, UE generates audio and video RTP packets, transmits the packets to the network and receives audio and video RTP packets from a remote device via the network (audio/video RTP) (100). In addition, UE transmits and receives audio and video RTPC packets (audio/video RTCP) (102). The incoming video RTCP packets indicate bad video quality or video freeze at the remote device (104). For example, the video RTCP packets may provide an indication of a number and/or ratio of RTP packets that were lost during transmission of the RTP packets over the network. UE may determine bad video quality or video freeze based on the number and/or ratio of RTP packets that were lost exceeding a threshold value.

In the example of FIG. 4, UE performs video rate adaptation to lower the video bitrate to a minimum bitrate (106) in response to receiving video RTCP packets that indicate bad video quality or video freeze at the remote device. UE also continues to receive audio and video RTP packets as well as audio and video RTCP packets (audio/video RTP/RTCP) (108). The incoming video RTCP packets indicate continued poor video quality or video freeze at the remote device, and UE downgrades the two-way video call to a one-way video call (110). For example, UE terminates the sender side video, such that UE sends only audio data without sending video data.

To carry out the downgrade, UE re-invites the remote device to a VT session in which UE transmits audio data only but receives both video and audio data (re-invite (video: recvonly, audio: sendrecv) (112). In some examples, UE may use session initiation protocol (SIP) to establish the VT session. For example, UE may send an invite SIP request to the remote device to establish the downgraded VT session.

UE may receive an acknowledgement from the remote device of the downgraded VT session (200 OK (video: sendonly, audio: sendrecv) (114). UE may then continue to transmit audio RTP packets to the remote device (audio RTP) and receive audio and video RTCP packets (audio/video RTCP) (116). UE may also continue receiving video RTP packets from the remote device (118).

Figure 5:
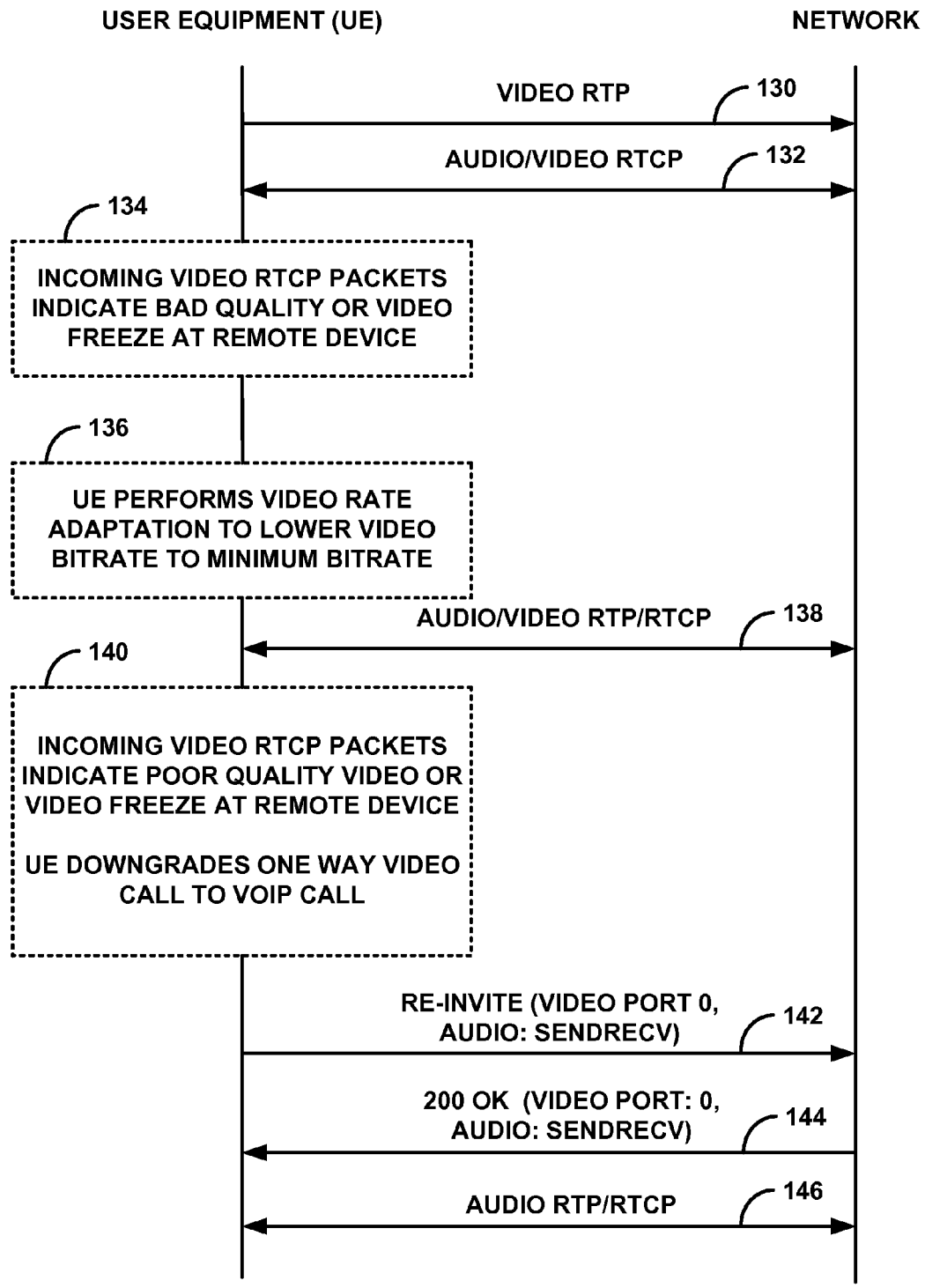
FIG. 5 is a flow diagram illustrating another example of a video downgrade, consistent with the techniques of this disclosure.

FIG. 5 is a flow diagram illustrating an example of downgrading a VT session with a one-way video connection to an audio-only VT session, consistent with the techniques of this disclosure. For example, FIG. 5 illustrates user equipment (UE) that is a participant in a VT session with a two-way video connection over a network. In some examples, UE may be configured in a similar manner as local device 42 (FIG. 2).

In the example of FIG. 5, UE generates video RTP packets and transmits the packets to the network (130). In addition, UE transmits and receives audio and video RTPC packets (audio/video RTCP) (132). The incoming video RTCP packets indicate bad video quality or video freeze at the remote device (134). For example, the video RTCP packets may provide an indication of a number and/or ratio of RTP packets that were lost during transmission of the RTP packets over the network. UE may determine bad video quality or video freeze based on the number and/or ratio of RTP packets that were lost exceeding a threshold value.

In the example of FIG. 5, UE performs video rate adaptation to reduce the video bitrate to a minimum bitrate (136). UE also continues to receive audio and video RTP packets as well as audio and video RTCP packets (audio/video RTP/RTCP) (138). The incoming video RTCP packets indicate continued poor video quality or video freeze at the remote device, and UE downgrades the one-way video call to a voice over IP (VOIP), such that the call is audio-only (140). For example, UE terminates the receiver side video, such that UE and the remote device both only send audio data without sending video data.

To carry out the downgrade, UE re-invites the remote device to an audio only VT session (re-invite (video port 0, audio: sendrecv) (142). In some examples, UE may use SIP to establish the VT session. For example, UE may send an invite SIP request to the remote device to establish the downgraded VT session.

UE may receive an acknowledgement from the remote device of the downgraded VT session (200 OK (video port 0, audio: sendrecv) (144). UE may then continue to transmit and receive audio RTP packets and audio RTCP packets (audio RTP/RTCP) (146).

In some examples, UE may use any combination of the techniques described with respect to FIG. 4 and FIG. 5. For example, UE may identify degraded playback at a remote device and downgrade a VT session having a two-way video connection to a one-way video connection (e.g., as described with respect to FIG. 4). UE may also re-identify degraded playback (or continuously identify degraded playback for a predetermined time period) and downgrade the one-way video connection to an audio-only VT session (e.g., as described with respect to FIG. 5). In other examples, UE may downgrade a two-way video telephony session directly to an audio-only session.

Figure 6:
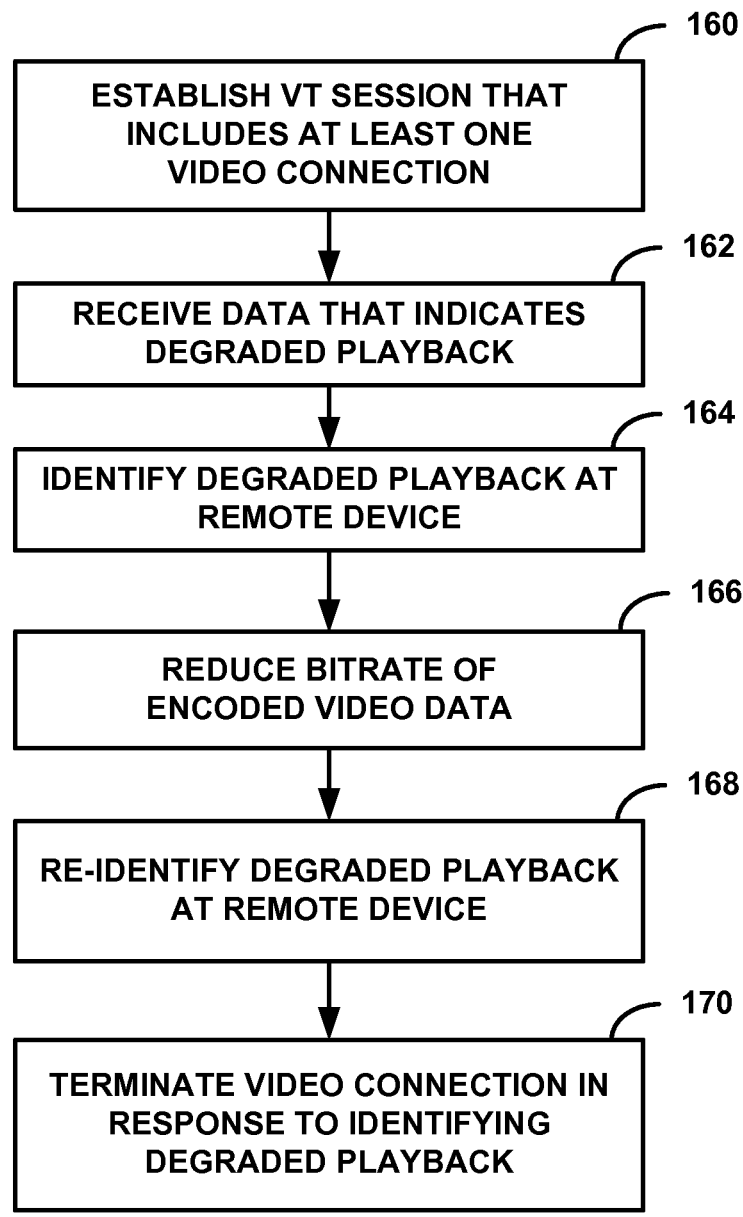
FIG. 6 is a flow diagram illustrating an example process for downgrading a VT session, consistent with the techniques of this disclosure.

FIG. 6 is a flow diagram illustrating an example process for downgrading a VT session, consistent with the techniques of this disclosure. The example of FIG. 6 is described with respect to local device 42 for purposes of illustration. However, it should be understood that the process of FIG. 6 may be carried out by a variety of other devices and/or processors.

In the example of FIG. 6, local device 42 may establish a VT session with a remote device (such as remote device 44) that includes at least one video connection (160). Local device 42 may also receive data that indicates degraded playback at the remote device (162). In some examples, the received data may include one or more RTCP packets that indicate packet loss.

Local device 42 may identify degraded playback at remote device 44 based on the received data (164). For example, local device 42 may determine that playback quality is poor, e.g., bad visual quality and/or video freezing, based on received data that indicates at least some data was lost during transmission from local device 42 to remote device 44. Local device 42 may identify the degraded playback based on an amount of data that is lost (e.g., a number or ratio of lost packets).

In the example of FIG. 6, in response to identifying the degraded playback at the remote device, local device 42 may reduce the bitrate of encoded data (166). In some examples, local device 42 may reduce the bitrate of the encoded data to a minimum bitrate that is supportable by video encoder 50 and/or channel 46. Local device 42 may reduce the bitrate of the encoded data in one or more steps prior to reaching the minimum bitrate that is supportable by video encoder 50.

Local device 42 may re-identify degraded playback of video data at remote device 44 (168). For example, local device 42 may continue to receive data that indicates that playback of data has not improved after reducing the bitrate of the encoded video data. In some examples, local device 42 may re-identify degraded playback after continuing to receive such data for a predetermined duration. Additionally or alternatively, local device 42 may re-identify degraded playback based on a number of RTCP messages that have been received that indicate packet loss above a threshold.

Local device 42 may terminate a video connection of the VT session in response to identifying degraded playback (170). For example, local device 42 may re-invite remote device 44 to a VT session that does not include the video connection. In some examples, local device 42 may terminate a video connection from local device 42 to remote device 44. In other examples, local device 42 may terminate a video connection from remote device 44 to local device 42.

It should be understood that depending on the example, certain acts or events of any of the techniques described with respect to FIG. 6 may be performed in a different sequence, may be added, merged, or left out altogether (e.g., not all described acts or events are necessary for the practice of the techniques).

The techniques described herein may be performed in any combination. In one example, a method of processing data includes, in a video telephony session between a local device (e.g., such as first device 12 or local device 42) and a remote device (e.g., such as second device 20 or remote device 44), where the video telephony session includes at least one video connection between the local device and the remote device, identifying degraded playback of the video data at the remote device. In response to identifying the degraded playback, the local device may terminate a video connection of the at least one video connection.

In some examples, the at least one video connection comprises a two-way video connection that includes a first video connection from the local device to the remote device and a second video connection from the remote device to the local device. In such examples, the local device may terminate the video connection by terminating the second video connection from the remote device to the local device to establish a one-way video connection, such that the local device receives audio data without receiving video data.

The method may further include re-identifying (or identifying for a predetermined time period), by the local device, degraded playback of the video data at the remote device. In response to re-identifying the degraded playback, the local device may terminate the first video connection from the local device to the remote device video to establish an audio-only connection, such that the local device and the remote device receive only audio data.

In some examples, the at least one video connection comprises a one-way video connection from the local device to the remote device. In such examples, the local device may terminate the video connection by terminating the one-way video connection to establish an audio-only connection, such that the local video telephony device and the remote device receive only audio data.

In some examples, identifying the degraded playback comprises receiving an indication of an amount of video data sent from the local device but not received by the remote device. Additionally or alternatively, receiving the indication of the amount of video data comprises receiving at least one of an indication of a number of packets of the video data lost or a fraction of packets of the video data lost.

In some examples, identifying the degraded playback comprises receiving a one or more RTCP packets and identifying the degraded playback based on the one or more RTCP packets. In other examples, additionally or alternatively, identifying the degraded playback comprises identifying an absence of one or more RTCP packets and identifying the degraded playback based on the absence of the one or more RTCP packets (e.g., based on not receiving expected RTCP packets).

In some examples, terminating the video connection comprises transmitting a Session Initiation Protocol (SIP) message from the local device to the remote device to terminate the video connection. Additionally or alternatively, prior to terminating the video connection, the local device may perform bitrate adaptation on the video connection to reduce a bitrate of the video data. In some instances, performing bitrate adaptation may include reducing the bitrate of the video data to a minimum bitrate supported by a video encoder of the local device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software units or modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing data, the method comprising:
   in a video telephony session between a local device and a remote device, identifying, by the local device, degraded playback of video data at the remote device, wherein the video telephony session comprises a one-way video connection from the local device to the remote device or a two-way video connection having a first video connection from the local device to the remote device and a second video connection from the remote device to the local device; and
   in response to identifying the degraded playback, terminating, by the local device, a video connection of the video telephony session, wherein terminating the video connection comprises at least one of:
      when the video telephony session comprises the one-way video connection, terminating the one-way video connection to establish an audio-only connection, such that the local device transmits only audio data and receives only audio data, and
      when the video telephony session comprises the two-way video connection, terminating the second video connection from the local device to the remote device to establish a one-way video connection, such that the local device transmits audio data without transmitting video data.

2. The method of claim 1, wherein the video telephony session comprises the two-way video connection, the method further comprising:
re-identifying, by the local device, degraded playback of the video data at the remote device;
in response to re-identifying the degraded playback, terminating the first video connection from the remote device to the local device to establish an audio-only connection, such that the local device transmits only audio data and receives only audio data.

3. The method of claim 1, wherein identifying the degraded playback comprises receiving an indication of an amount of video data sent from the local device but not received by the remote device.

4. The method of claim 3, wherein receiving the indication of the amount of video data comprises receiving at least one of an indication of a number of packets of the video data lost or a fraction of packets of the video data lost.

5. The method of claim 1, wherein identifying the degraded playback comprises receiving a one or more Real-time Transport Protocol (RTP) Control Protocol (RTCP) packets and identifying the degraded playback based on the one or more RTCP packets.

6. The method of claim 1, wherein identifying the degraded playback comprises identifying an absence of one or more Real-time Transport Protocol (RTP) Control Protocol (RTCP) packets and identifying the degraded playback based on the absence.

7. The method of claim 1, wherein terminating the one-way video connection or terminating the second video connection comprises transmitting a Session Initiation Protocol (SIP) message from the local device to the remote device to terminate the video connection.

8. The method of claim 1, further comprising:
prior to terminating the video connection, performing bitrate adaptation on the video connection to reduce a bitrate of the video data.

9. The method of claim 8, wherein performing bitrate adaptation comprises reducing the bitrate of the video data to a minimum bitrate supported by a video encoder of the local device.

10. A device for processing data, the device comprising:
a memory configured to store video data; and
one or more processors of a local device configured to:
in a video telephony session between the local device and a remote device, identify, by the local device, degraded playback of video data at the remote device, wherein the video telephony session comprises a one-way video connection from the local device to the remote device or a two-way video connection having a first video connection from the local device to the remote device and a second video connection from the remote device to the local device; and
in response to identifying the degraded playback, terminate a video connection of the video telephony session, wherein to terminate the video connection, the one or more processors of the local device are configured to perform at least one of:
when the video telephony session comprises the one-way video connection, terminate the one-way video connection to establish an audio-only connection, such that the local device transmits only audio data and receives only audio data, and
when the video telephony session comprises the two-way video connection, terminate the second video connection from the local device to the remote device to establish a one-way video connection, such that the local device transmits audio data without transmitting video data.

11. The device of claim 10, wherein the video telephony session comprises the two-way video connection, and wherein the one or more processors are further configured to:
re-identify, by the local device, degraded playback of the video data at the remote device;
in response to re-identifying the degraded playback, terminate the first video connection from the remote device to the local device to establish an audio-only connection, such that the local device transmits only audio data and receives only audio data.

12. The device of claim 10, wherein to identify the degraded playback, the one or more processors are configured to receive an indication of an amount of video data sent from the local device but not received by the remote device.

13. The device of claim 12, wherein to receive the indication of the amount of video data, the one or more processors are configured to receive at least one of an indication of a number of packets of the video data lost or a fraction of packets of the video data lost.

14. The device of claim 10, wherein to identify the degraded playback, the one or more processors are configured to receive a one or more Real-time Transport Protocol (RTP) Control Protocol (RTCP) packets and identifying the degraded playback based on the one or more RTCP packets.

15. The device of claim 10, wherein to identify the degraded playback, the one or more processors are configured to identify an absence of one or more Real-time Transport Protocol (RTP) Control Protocol (RTCP) packets and identifying the degraded playback based on the absence.

16. The device of claim 10, wherein to terminate the one-way video connection or to terminate the second video connection, the one or more processors are configured to transmit a Session Initiation Protocol (SIP) message from the local device to the remote device to terminate the video connection.

17. The device of claim 10, wherein the one or more processors are further configured to:
prior to terminating the video connection, perform bitrate adaptation on the video connection to reduce a bitrate of the video data.

18. The device of claim 17, wherein to perform bitrate adaptation, the one or more processors are configured to reduce the bitrate of the video data to a minimum bitrate supported by a video encoder of the local device.

19. The device of claim 10, wherein the local device comprises at least one of:
an integrated circuit;
a microprocessor; or
a wireless communication device.

20. An apparatus for processing data, the apparatus comprising:
in a video telephony session between a local device and a remote device, means for identifying, by the local device, degraded playback of video data at the remote device, wherein the video telephony session comprises a one-way video connection from the local device to the remote device or a two-way video connection having a first video connection from the local device to the remote device and a second video connection from the remote device to the local device; and means for terminating, in response to identifying the degraded playback, a video connection of the video telephony session, wherein the means for terminating the video connection comprises at least one of:
means for terminating, when the video telephony session comprises the one-way video connection, the one-way video connection to establish an audio-only connection, such that the local device transmits only audio data and receives only audio data, and
means for terminating, when the video telephony session comprises the two-way video connection, the second video connection from the local device to the remote device to establish a one-way video connection, such that the local device transmits audio data without transmitting video data.

21. The apparatus of claim 20, wherein the video telephony session comprises the two-way video connection, the apparatus further comprising:
means for re-identifying, by the local device, degraded playback of the video data at the remote device;
means for terminating, in response to re-identifying the degraded playback, the first video connection from the remote device to the local device to establish an audio-only connection, such that the local device transmits only audio data and receives only audio data.

22. A non-transitory computer-readable medium having instructions stored thereon that, when executed, cause one or more processors to:
in a video telephony session between a local device and a remote device, identify, by the local device, degraded playback of video data at the remote device, wherein the video telephony session comprises a one-way video connection from the local device to the remote device or a two-way video connection having a first video connection from the local device to the remote device and a second video connection from the remote device to the local device; and
in response to identifying the degraded playback, terminate, by the local device, a video connection of the video telephony session, wherein to terminate the video connection, the instructions cause the one or more processors to perform at least one of:
when the video telephony session comprises the one-way video connection, terminate the one-way video connection to establish an audio-only connection, such that the local device transmits only audio data and receives only audio data, and
when the video telephony session comprises the two-way video connection, terminate the second video connection from the local device to the remote device to establish a one-way video connection, such that the local device transmits audio data without transmitting video data.

23. The non-transitory computer-readable medium of claim 22, wherein the video telephony session comprises the two-way video connection, and wherein the instructions further cause the one or more processors to:
re-identify, by the local device, degraded playback of the video data at the remote device;
in response to re-identifying the degraded playback, terminate the first video connection from the remote device to the local device to establish an audio-only connection, such that the local device transmits only audio data and receives only audio data.

* * * * *